US012428270B2

(12) United States Patent
Chettibi

(10) Patent No.: US 12,428,270 B2
(45) Date of Patent: Sep. 30, 2025

(54) COLLISION AVOIDANCE SYSTEM FOR A MOBILE CRANE ON A WORK SITE

(71) Applicant: AMCS TECHNOLOGIES, Collegien (FR)

(72) Inventor: Mohamed Chettibi, Collegien (FR)

(73) Assignee: AMCS TECHNOLOGIES, Collegien (FR)

( * ) Notice: Subject to any disclaimer, the term of this patent is extended or adjusted under 35 U.S.C. 154(b) by 170 days.

(21) Appl. No.: 18/282,800

(22) PCT Filed: Mar. 9, 2022

(86) PCT No.: PCT/EP2022/055991

§ 371 (c)(1),
(2) Date: Sep. 19, 2023

(87) PCT Pub. No.: WO2022/200040

PCT Pub. Date: Sep. 29, 2022

(65) Prior Publication Data

US 2024/0166475 A1 May 23, 2024

(30) Foreign Application Priority Data

Mar. 24, 2021 (EP) .................................... 21305367

(51) Int. Cl.
*B66C 13/46* (2006.01)
*B66C 13/48* (2006.01)
*B66C 23/88* (2006.01)

(52) U.S. Cl.
CPC .............. *B66C 13/48* (2013.01); *B66C 13/46* (2013.01); *B66C 23/88* (2013.01)

(58) Field of Classification Search
None
See application file for complete search history.

(56) References Cited

U.S. PATENT DOCUMENTS

2013/0013251 A1* 1/2013 Schoonmaker ......... B66C 15/04 702/152
2015/0161872 A1* 6/2015 Beaulieu ................. B66C 13/40 340/686.6

(Continued)

FOREIGN PATENT DOCUMENTS

FR 2638440 A1 5/1990
FR 2670195 A1 6/1992
WO 2019/107648 A1 6/2019

OTHER PUBLICATIONS

International Search Report and Written Opinion received for PCT Application No. PCT/EP2022/055991 dated Jun. 3, 2022, 16 pages including English translation.

*Primary Examiner* — Peter D Nolan
*Assistant Examiner* — Jacob Kent Besteman-Street
(74) *Attorney, Agent, or Firm* — Helene Laville; HEFIP, LLC

(57) ABSTRACT

Disclosed is a system for managing collision avoidance of a first crane on a work site on which a second crane is located, the second crane being mobile, the system comprising: —a collision avoidance system of the first crane, configured so as to prevent a collision between the first crane and its environment; —a communication device configured to receive from the second crane an indication of the position of the second crane on the work site and to send to the second crane a confirmation of receipt of the indication of the position of the second crane on the site, when the indication of the position of the second crane corresponds to a distance, relative to the first crane, less than or equal to a first threshold value Zc; —a collision avoidance management module of the first crane, configured so as to activate the collision avoidance system of the first crane when the indication of the position of the second crane corresponds to a distance, relative to the first crane, less than or equal to a (Continued)

second threshold value Zd less than the first threshold value Zc.

13 Claims, 3 Drawing Sheets

(56) References Cited

U.S. PATENT DOCUMENTS

| | | | | |
|---|---|---|---|---|
| 2017/0369288 | A1* | 12/2017 | Fulton | G05B 19/0426 |
| 2019/0102712 | A1* | 4/2019 | Duca | G06Q 10/08 |
| 2022/0411239 | A1* | 12/2022 | Lim | B66C 23/88 |

* cited by examiner

COLLISION AVOIDANCE SYSTEM FOR A MOBILE CRANE ON A WORK SITE

This application is a § 371 National Phase Application of International Application No. PCT/EP2022/055991, filed on Mar. 9, 2022, which claims priority to European Patent application Ser. No. 21/305,367.1, filed in Europe on Mar. 24, 2021, a disclosure of which are incorporated herein by reference in their entirety.

FIELD OF THE INVENTION

The object of the invention is a collision avoidance management system for a first crane in a job site on which a second crane is disposed, the second crane being mobile and equipped with a system for managing working modes according to the invention.

STATE OF THE ART

It is known that in a job site comprising one or more cranes there is a risk of collision between part of the crane or of the load carried by the crane and other elements in the job site.

The applicant has developed a so-called collision avoidance solution that ensures that a crane does not collide with another crane or with an existing structure during site operation. This type of collision avoidance system comprises a set of sensors for determining the position and orientation of the crane boom as well as the position of the crane hook in real time.

The collision avoidance system can be used to avoid a collision with existing structures in the job site. To avoid this type of collision, the collision avoidance system uses a mapping of the site, defining so-called forbidden zones in which the crane hook and/or boom should not be at the risk of causing a collision or a falling load.

When the collision avoidance system detects that the crane boom or hook is approaching a forbidden zone, an alarm can be triggered for the crane operator, or the crane control units can be directly activated to limit displacement and avoid any risk of collision.

Collision avoidance systems can also be used to manage complex job sites where several construction machines may be working simultaneously. In particular, it is possible to have several cranes working at the same time in a same job site. In such a configuration, it is essential to ensure that the cranes cannot collide with each other.

In order to avoid collisions between cranes in a same job site, a crane collision avoidance device needs to know in real time the position of other cranes likely to collide with it.

FIG. 1 illustrates a configuration according to which two cranes, G1 and G2, are working simultaneously in a job site. As illustrated in FIG. 1, it is possible to define a working zone Z1 or Z2 for each crane, within which the boom of each crane is likely to displace.

In dense job sites, it is possible that the working zones Z1 and Z2 partially overlap with each other. There is then a so-called interference zone ZI in which there is a risk of collision between both cranes G1 and G2.

The collision avoidance system of the applicant makes it possible to avoid the risk of collision of both cranes G1 and G2 in particular in the interference zone ZI. Typically, if the positions of both cranes are known (no sensor or communication fault), the collision avoidance system allows both cranes to be in the interference zone simultaneously. The system will limit movements of one crane or the other when it determines (by calculating positions) that crane elements (boom, hook, etc.) are getting dangerously close to each other.

This collision avoidance system requires real-time knowledge of the positions of each of the cranes. The cranes in the job site should therefore communicate their respective positions in real time.

It may happen that the exact position of a crane is unknown, for example, due to a fault in one of the position sensors or a fault in the communication system. In such a situation, the collision avoidance devices of the other cranes handle the common interference zone with the faulty crane as a forbidden zone. This action is commonly referred to as activating the positive safety of the collision avoidance device.

For example, if the crane G1 is no longer able to correctly communicate its position to the crane G2, the collision avoidance device of the crane G2 will handle the interference zone as a forbidden zone and prevent the operator of the crane G2 from going into said zone.

Activating positive safety avoids the risk of collision, but has an obvious drawback in terms of loss of productivity and possible delay to the job site.

The problem of loss of productivity is all the greater when one of the cranes is mobile. Indeed, a mobile crane interference zone extends over the entire job site. As a result, in the case where the crane does not communicate its position any longer, the forbidden zone potentially extends to the entire job site, as illustrated in FIG. 2.

Thus, with the current collision avoidance system, when a mobile crane in a job site no longer communicates its position correctly, all the cranes in the job site are stopped. This leads to a major loss of productivity and a potential delay in the job site.

It is therefore necessary to enhance the existing collision avoidance system to ensure safety in the job site while maintaining a level of productivity in the event of a positioning fault crane, in particular a mobile crane.

One object of the present invention is to provide a system for solving this problem.

BRIEF DESCRIPTION OF THE INVENTION

To this end, the object of the present invention is a collision avoidance management system for a first crane in a job site on which a second crane is disposed, the second crane being mobile, the system comprising:

- a collision avoidance system for the first crane configured to avoid a collision between the first crane and its environment,
- a communication device configured to receive from the second crane an indication of the position of the second crane in the job site and to send to the second crane confirmation of receipt of the indication of the position of the second crane in the job site when the indication of the position of the second crane corresponds to a distance from the first crane less than or equal to a first threshold value Zc,
- a module for managing the collision avoidance of the first crane, configured to activate the collision avoidance system of the first crane when the indication of the position of the second crane corresponds to a distance from the first crane less than or equal to a second threshold value Zd less than the first threshold value Zc.

Advantageously, the collision avoidance management system according to the invention enables the collision avoidance system to be activated only when the second crane is in proximity to the first crane. In this way, a communication problem between both cranes only affects the productivity of the first crane when the mobile crane is at a distance less than the first threshold value Zd from said first crane.

Advantageously, the invention enables the cranes to continue working together when they have an interference zone ZI by warning the operator or preventing any movement of the crane elements (boom, hook, etc.) presenting a risk of collision on the one hand, and by authorising movements that do not present a risk of collision on the other. The invention therefore makes it possible to maintain a level of productivity in the event of proximity between the different construction elements in a job site.

The collision avoidance management system according to the invention may also comprise one or more of the following characteristics considered individually or according to any possible combinations:

- the collision avoidance management system is configured so that the second threshold value Zd is greater than or equal to the sum of the maximum ranges of the first crane and the second crane; and/or
- the collision avoidance management system is configured so that the first threshold value Zc is greater than Zd, for example greater than Zd+10 m;

and/or

- the collision avoidance management module of the first crane is configured to deactivate the collision avoidance system of the first crane when the indication of the position of the second crane corresponds to a distance from the first crane greater than a third threshold value Zv greater than the second threshold value Zd and less than the first threshold value Zc, for example Zd<Zv<Zc, preferably Zd+2m≤Zv≤Zc−2m; and/or
- the second crane comprises a collision avoidance system configured to avoid a collision between the second crane and its environment; and/or
- the collision avoidance management module of the second crane is configured to trigger an alarm for the operator of the second crane and/or to prevent the second crane from approaching to a distance from the first crane that is less than the second threshold value Zd when the second crane does not receive confirmation of receipt of the indication of its position; and/or
- in the event of a risk of collision, the collision avoidance system enables an alarm to be triggered for the operator of the crane concerned; and/or
- in the event of a risk of collision, the collision avoidance system automatically stops the movements of the crane concerned; and/or
- the second crane is equipped with a working mode management system, the system comprising:
  - a position sensor for the second crane in the job site
  - a position sensor for the hook of the second crane relative to a reference point of said crane
  - a module for managing the working mode of said crane, configured to define the working mode of said crane chosen from:
    - the “displacement” mode corresponding to a displacement of said crane in the job site,
    - the “fixed work” mode corresponding to a situation in which said crane is fixed in the job site and the position of its hook is variable,
  - a working mode communication device configured to communicate to the first crane an indication of the working mode of said second crane; and/or
- the working mode communication device is configured to trigger an alarm when it does not receive confirmation of receipt of the indication of its working mode and the indication of the position of the second crane corresponds to a distance from the first crane less than or equal to the first threshold value Zc; and/or
- the collision avoidance management module is configured to manage the collision avoidance system when it is active:
  - by handling the second crane as a fixed crane when said second crane is in the «fixed work” mode, and
  - by handling the second crane as a mobile crane with an unknown position when the second crane is in the “displacement” mode.

According to one embodiment of the invention, when the configuration of the job site allows it and the risk of collision between tower cranes and moving mobile cranes is zero, the collision avoidance management module can be configured to manage the collision avoidance system when it is active:

- by handling the second crane as a fixed crane when said second crane is in the «fixed work” mode, and
- by leaving movements of the first crane free in the event of a fault in the second crane when the second crane is in the “displacement” mode.

Advantageously, a system for managing the working modes of a mobile crane in a job site according to the invention makes it possible to limit impact of a positioning fault of a fixed crane in a job site equipped with a collision avoidance device.

Indeed, the working mode management module can distinguish between situations in which the mobile crane is in displacement and situations in which the mobile crane is fixed in the job site.

Advantageously, when the mobile crane is in the “fixed work” mode, it can be handled by the collision avoidance system as a fixed crane in the event of a fault in its position. Thus, the forbidden zone does not necessarily extend to the whole of the job site, enabling the forbidden zone to be limited to the zone around the fixed position of the mobile crane, thus preserving productivity of the job site.

BRIEF DESCRIPTION OF THE FIGURES

Other characteristics and advantages of the present invention will become apparent upon reading the description and the following figures.

It should be noted that these drawings are only intended to illustrate the text of the description and do not in any way limit the scope of the invention.

In the different figures, similar elements are designated by identical references.

Furthermore, the different embodiments of the invention are compatible with each other.

DETAILED DESCRIPTION OF THE INVENTION

Figure 1:
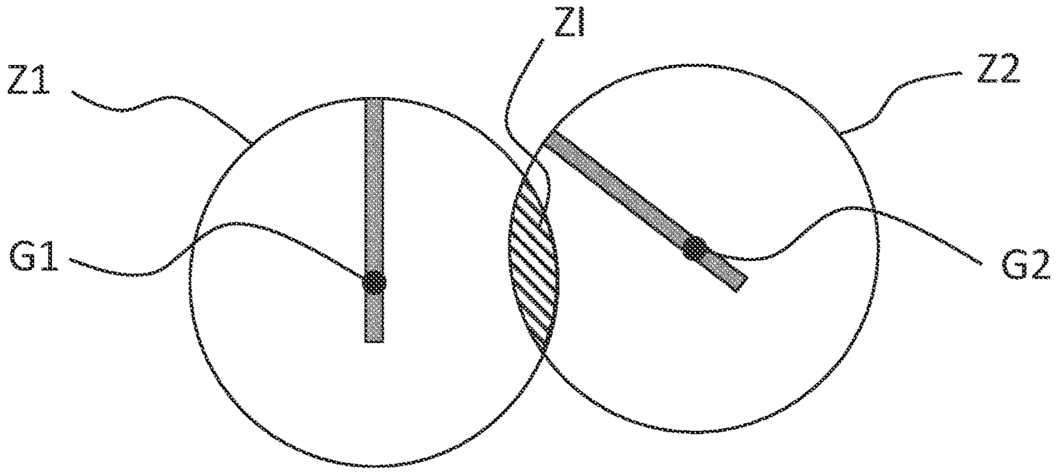
FIG. 1 is a schematic representation of two fixed cranes equipped with a collision avoidance system according to prior art.
Figure 2:
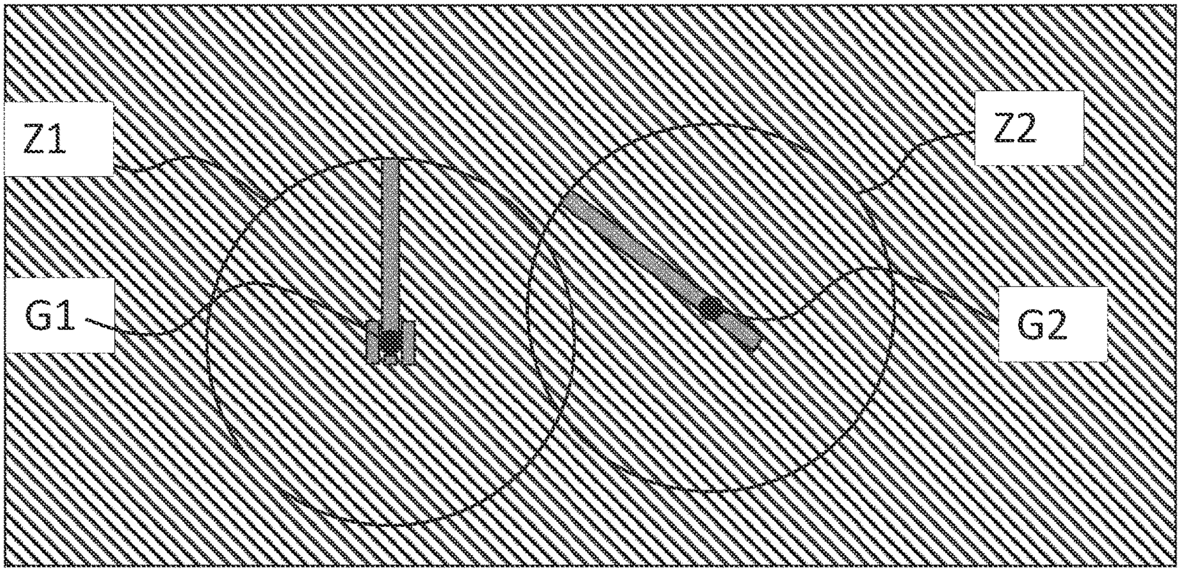
FIG. 2 is a schematic representation of two cranes, one fixed and the other mobile, equipped with a collision avoidance system according to prior art.
Figure 3:
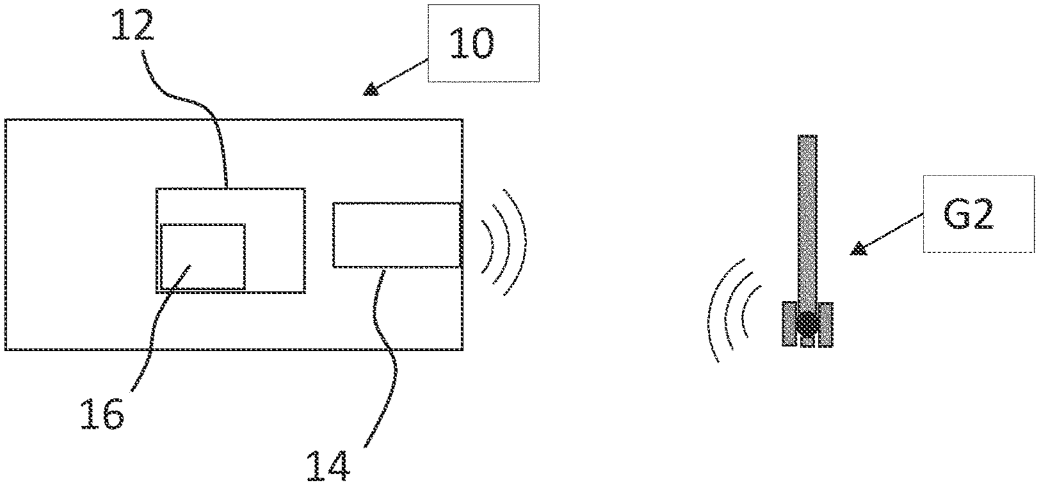
FIG. 3 is a schematic representation of a collision avoidance management system for a first crane in a job site on which a second crane according to the invention is disposed.

As represented in FIG. 3, the invention relates to a collision avoidance management system 10 for a crane in a job site, on which a second crane G2 is disposed, the second crane being mobile.

The first crane may be a fixed crane, for example a conventional tower crane, or a mobile crane.

For the purposes of the invention, a mobile crane is a crane configured to be displaced freely in a job site, unlike a fixed crane or tower crane whose base is fixed or translates on rails along a predefined direction. A mobile crane, also known as a gin truck, truck crane or self-propelled crane, can be displaced on wheels or tracks before being deployed to handle loads.

The collision avoidance management system 10 according to the invention is installed on the first crane and, in the event of a risk of collision between the first crane and an element in its environment, either triggers an alarm or acts on the crane control units in order to avoid the collision. The collision avoidance management system may be a collision avoidance management system already used by the applicant on a large number of job sites. In particular, a way of determining a risk of collision by taking account of the position of the crane and its hook is known to the person skilled in the art. A way of triggering an alarm or acting on the crane control units in the event of a risk of collision is also known to the person skilled in the art.

As illustrated in FIG. 3, the collision avoidance management system 10 according to the invention comprises at least:

- a collision avoidance system 12 of the first crane,
- a communication device 14, and
- a collision avoidance management module 16.

The collision avoidance system 12 of the first crane is configured to avoid a collision between the first crane and its environment.

Figure 4:
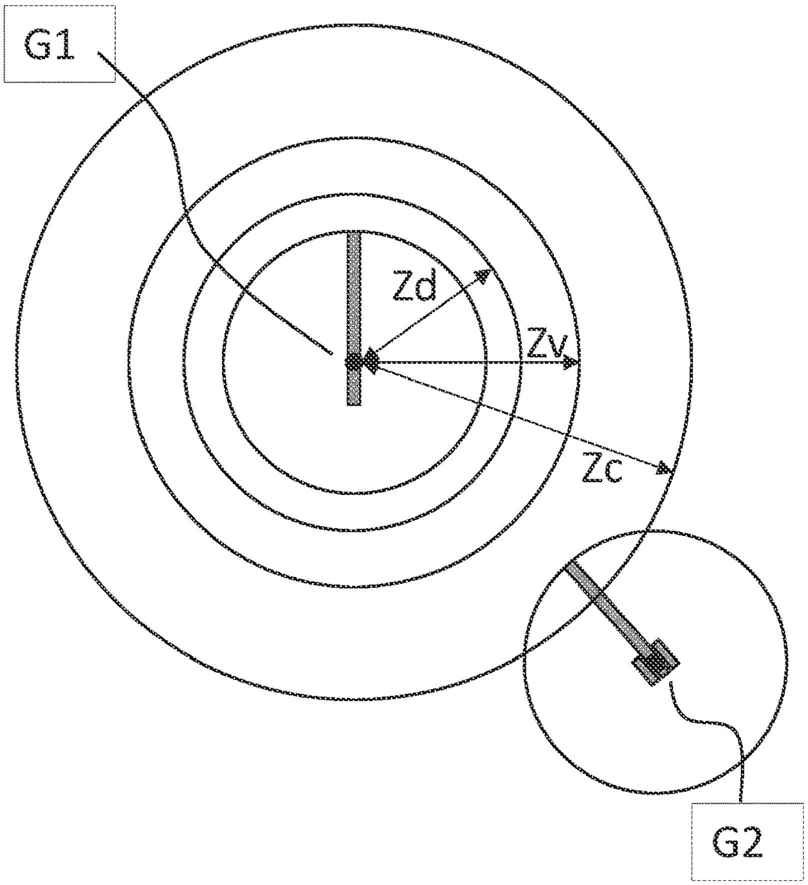
FIG. 4 is a schematic representation of one embodiment of the invention.

According to one embodiment of the invention illustrated in FIG. 4, the communication device 14 is configured to receive from the second crane an indication of the position of the second crane in the job site and/or of the position of the hook of the boom of the second crane, and to send to the second crane a confirmation of receipt of the indication of the position of the second crane in the job site when the indication of the position of the second crane corresponds to a distance from the first crane less than or equal to a first threshold value Zc. Typically, the communication device 14 is configured to communicate with the second crane in real time, for example by radio communication. This type of communication is already used between two fixed cranes for collision avoidance systems of the applicant.

The collision avoidance management module 16 of the first crane is configured to activate the collision avoidance system of the first crane when the indication of the position of the second crane corresponds to a distance from the first crane less than or equal to a second threshold value Zd less than the first threshold value Zc.

Typically, the second threshold value Zd is greater than or equal to the sum of the maximum ranges of the first crane and the second crane. For example, the second threshold value is equal to 1.1 times the sum of the maximum ranges of the first crane and the second crane.

The first threshold value may be equal to 2 times the first threshold value. For example, the first threshold value Zc is greater than Zd+10 m.

Advantageously, this embodiment makes it possible to limit impact of faults in the second crane on the productivity of the first crane. Indeed, the second crane faults are only taken into account by the first crane collision avoidance system 12 when the second crane is close enough to the first crane, at a distance less than or equal to the first threshold value Zc.

According to one advantageous embodiment, the collision avoidance management module 16 of the first crane is configured to deactivate the collision avoidance system 12 of the first crane when the indication of the position of the second crane corresponds to a distance from the first crane greater than a third threshold value Zv greater than the second threshold value Zd and less than the first threshold value Zc, for example $Zd<Zv<Zc$, or $Zd+2m \leq Zv \leq Zc-2m$.

In other words, when the collision avoidance system 12 of the first crane is activated, it can be deactivated when the distance between both cranes is greater than the third threshold value Zv.

Advantageously, the use of a third threshold value greater than the second threshold value Zd and less than the first threshold value Zc for deactivating the collision avoidance system 12 of the first crane makes it possible to avoid untimely triggering and deactivation of the collision avoidance device of the first crane when the second crane is displaced at a distance of about the second threshold value Zd.

According to one embodiment of the invention, the collision avoidance management system 10 comprises a collision avoidance system for the second crane configured to avoid a collision between the second crane and its environment.

According to one embodiment of the invention, the collision avoidance management module of the second crane is configured to trigger an alarm for the operator of the second crane and/or prevent the second crane from approaching to a distance from the first crane less than the second threshold value Zd when the second crane does not receive confirmation of receipt of the indication of its position.

According to one embodiment of the invention, in the event of a risk of collision, the collision avoidance system enables an alarm to be triggered for the operator of the crane concerned.

According to one embodiment, in the event of a risk of collision, the collision avoidance system automatically stops movements of the crane concerned.

According to one embodiment of the invention, when the configuration of the job site allows it and the risk of collision between tower cranes and mobile cranes in displacement is zero, the collision avoidance management module can be configured to manage the collision avoidance system when it is active:

- by handling the second crane as a fixed crane when said second crane is in the "fixed work" mode, and
- by leaving movements of the first crane free in the event of a fault in the second crane when the second crane is in the "displacement" mode.

Figure 5:
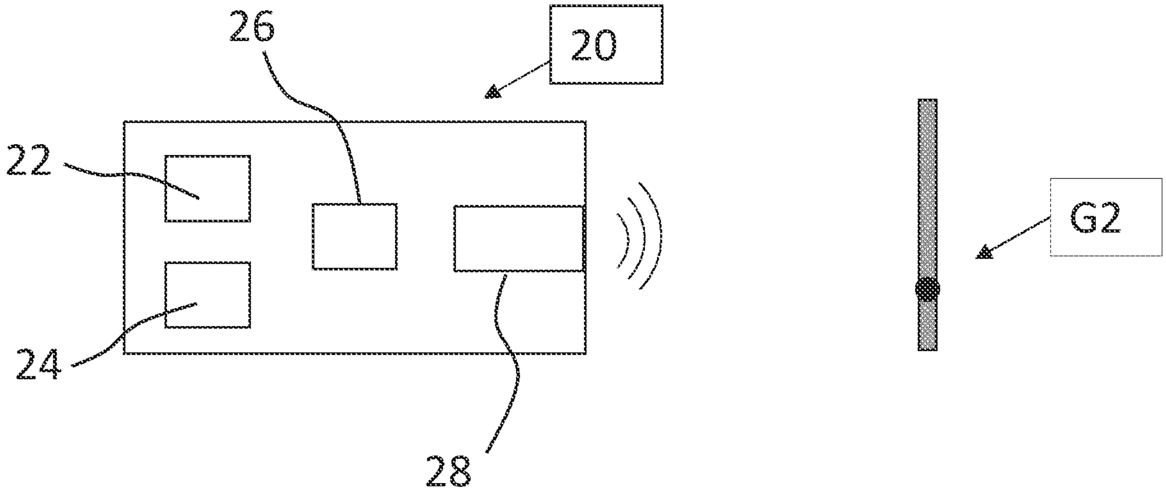
FIG. 5 is a schematic representation of a management system for a mobile crane according to the invention.

As illustrated in FIG. 5, according to one embodiment of the invention the second crane can be equipped with a system for managing different working modes of a mobile crane according to the invention comprises at least:

- a position sensor 22 for the mobile crane in the job site,
- a position sensor 24 for the hook of the mobile crane, a mobile crane working mode management module 26, and a communication device 28.

The position sensor 22 of the mobile crane in the job site makes it possible to determine the position of at least one reference point of the mobile crane in the job site. The position of the mobile crane can be expressed in a reference frame for the site. Typically, the position sensor 22 is configured to enable a geolocation function using a satellite positioning system (GNSS), for example the GPS, Galileo or Glonass system.

In order to increase the positioning accuracy of the mobile crane, the position sensor 22 can also be configured to communicate with a GNSS correction system.

The position sensor 24 for the hook of the mobile crane makes it possible to determine the position of the mobile crane hook relative to a fixed point on the crane. The position of the mobile crane hook can be determined by the orientation of the mobile crane boom and/or the extension of the mobile crane boom and/or the height of the mobile crane hook and/or the inclination of the mobile crane boom.

The mobile crane working mode management module 26 is configured to define the mobile crane working mode selected from at least:

the "displacement" mode corresponding to a displacement of the mobile crane in the job site, the "fixed work" mode corresponding to a situation in which the mobile crane is fixed in the job site and the position of its hook is variable.

The working mode management module can be connected to the position sensors 22 and 24, for example to determine the working mode of the mobile crane.

Thus, according to a preferred mode of the invention, the working mode management module 26 for the mobile crane automatically defines the working mode of the mobile crane by means of the position sensor 22 of the mobile crane in the job site and/or the hook position sensor 24 of the mobile crane relative to a reference point of said mobile crane. Advantageously, such a configuration makes it possible to avoid human intervention and enables the mobile crane operator to concentrate on operating the crane.

Alternatively, transition from one working mode to the other can be carried out totally or partially manually. For example, the mobile crane operator uses a specific interface to indicate to the working mode management module which working mode the mobile crane is in. The working mode management module can also provide a working mode to the operator who confirms or not the working mode determined by the working mode management module.

As indicated previously, the mobile crane can automatically determine the working mode of the mobile crane, for example the working mode management module of the mobile crane defines the working mode as "fixed work" when the skids of the mobile crane are extended.

According to one embodiment of the invention, the mobile crane working mode management module 26 is configured to define a "parking" mode corresponding to a situation in which the mobile crane is parked and the position of its boom hook is fixed. Typically, the mobile crane is parked at a given position, generally with its boom folded and switched off.

When the crane operating mode management module 26 is configured in the "parking" mode, the position of the crane in the job site and the position of the hook are stored, for example by the other cranes present in the job site. Advantageously, when the mobile crane is switched off after being parked, productivity of the other cranes in the job site is not impacted.

The communication device 28 is configured to communicate an indication of the working mode of the mobile crane to at least one other crane G2 in the job site. Communication between the communication device 28 and at least one other crane is typically by radio communication.

Preferably, the communication device 28 is configured to communicate in real time, typically with a period of less than 2 seconds, preferably less than 1.2 second, to at least one other crane G2 an indication of the working mode of the mobile crane.

For the purposes of the invention, a communication is in real time if the period between two information updates is less than 2 seconds, preferably less than 1.2 second.

According to one embodiment of the invention, the working mode communication device 28 is configured to trigger an alarm when it does not receive confirmation of receipt of the indication of its working mode and the indication of the position of the second crane corresponds to a distance from the first crane less than or equal to the first threshold value Zc.

According to one embodiment of the invention, the collision avoidance management module is configured to manage the collision avoidance system when it is active, that is when the second crane is at a distance less than or equal to Zd from the first crane:

by handling the second crane as a fixed crane when said second crane is in the "fixed work" mode, and by handling the second crane as a mobile crane when said second crane is in the "displacement" mode.

In the event of a fault in the second crane and, for example, when the second crane is at a distance less than or equal to Zd from the first crane, the collision avoidance management module 16 activates the collision avoidance system 12:

by handling the second crane as a fixed crane with a known position when said second crane is in the «fixed work" mode, and by handling the second crane as a mobile crane with an unknown position when the second crane is in the "displacement" mode. To ensure safety in the job site in this case, the first crane can be stopped until the second crane is restored.

Advantageously, handling the second crane as a fixed crane with a known position when said second crane is in the "fixed work" mode avoids stopping all movements of the first crane and limits the forbidden zone to the perimeter of the second crane only. In particular, if the respective positions in the job site of the first and second cranes do not involve a common reach zone between both cranes, the first crane is not impacted by a fault in the second crane.

This is all the more advantageous when the site comprises a large number of cranes. In other words, according to one embodiment, the collision avoidance management module 16 is configured so that, in the event of a fault in the second crane, it activates the positive safety of the collision avoidance device by preventing any movement of the first crane when the second crane is in the "displacement" mode and close to the first crane, or when the configuration of the site allows this and the risk of collision between tower cranes and mobile cranes in displacement is zero, leaving movements of the first crane free.

The collision avoidance management module for the first crane may also include a memory for recording the working mode and position of the second crane. In particular, when the second crane is in the "parking" mode, it may be switched off and not necessarily communicate its working mode and/or its position in the job site in real time. Thus, according to one embodiment of the invention, the collision avoidance management module for the first crane is configured to consider the working mode of the second crane as "in displacement" when the first crane receives no indication of the working mode of the second crane and the mode registered is not the "parking" mode.

The invention has been described above with the aid of the embodiments set forth in the figures, without limiting the general inventive concept.

Many other modifications and variations are suggested to the person skilled in the art on their own, after consideration of the different embodiments illustrated in this application.

These embodiments are given by way of example and are not intended to limit the scope of the invention, which is determined exclusively by the claims below.

In the claims, the word "comprising" does not exclude other elements or steps, and the use of the indefinite article "a" or "an" does not exclude a plurality. The mere fact that different characteristics are listed in mutually dependent claims does not indicate that a combination of those characteristics cannot advantageously be used. Finally, any reference used in the claims should not be construed as limiting the scope of the invention.

The invention claimed is:

1. A collision avoidance management system for a first crane in a job site on which a second crane is disposed, the second crane being mobile, the system comprising:

- a collision avoidance system for the first crane, configured to avoid a collision between the first crane and its environment,
- a communication device configured to receive from the second crane an indication of the position of the second crane in the job site and to send to the second crane confirmation of receipt of the indication of the position of the second crane in the job site when the indication of the position of the second crane corresponds to a distance from the first crane less than or equal to a first threshold value Zc,
- a collision avoidance management module for the first crane, configured to activate the collision avoidance system of the first crane when the indication of the position of the second crane corresponds to a distance from the first crane less than or equal to a second threshold value Zd less than the first threshold value Zc.

2. The collision avoidance management system according to claim 1, wherein the second threshold value Zd is greater than or equal to the sum of the maximum ranges of the first crane and the second crane.

3. The collision avoidance management system according to claim 1, wherein the first threshold value Zc is greater than Zd.

4. The collision avoidance management system according to claim 3, wherein the first threshold value Zc is greater than Zd+10 m.

5. The collision avoidance management system according to claim 1, wherein the collision avoidance management module of the first crane is configured to deactivate the collision avoidance system of the first crane when the indication of the position of the second crane corresponds to a distance from the first crane greater than a third threshold value Zv greater than the second threshold value Zd and less than the first threshold Zc.

6. The collision avoidance management system according to claim 5, wherein $Zd<Zv<Zc$.

7. The collision avoidance management system according to claim 1, comprising a collision avoidance system for the second crane configured to avoid a collision between the second crane and its environment.

8. The collision avoidance management system according to claim 5, wherein the collision avoidance management module of the second crane is configured to trigger an alarm for an operator of the second crane and/or prevent the second crane from approaching to a distance from the first crane less than the second threshold value Zd when the second crane does not receive confirmation of receipt of the indication of its position.

9. The collision avoidance management system according to claim 7, wherein the collision avoidance system enables an alarm to be triggered for the operator of the crane concerned in the event of a risk of collision.

10. The collision avoidance management system according to claim 7, wherein the collision avoidance system enables the movements of the crane concerned to be stopped automatically in the event of a risk of collision.

11. The collision avoidance management system according to claim 10, wherein the second crane is equipped with a working mode management system, the working mode management system comprising:

- a position sensor for the second crane in the job site,
- a position sensor for the hook of the second crane relative to a reference point on the crane,
- a module for managing the working mode of said crane, configured to define the working mode of said crane selected from:
- the "displacement" mode, corresponding to a displacement of the crane in the job site,
- the "fixed work" mode, corresponding to a situation in which the crane is fixed in the job site and the position of its hook is variable,
- a working mode communication device configured to communicate to the first crane an indication of the working mode of said second crane.

12. The collision avoidance management system according to claim 11, wherein the working mode communication device is configured to trigger an alarm when it does not receive confirmation of receipt of the indication of its working mode and the indication of the position of the second crane corresponds to a distance from the first crane less than or equal to the first threshold value Zc.

13. The collision avoidance management system according to claim 11, wherein the collision avoidance management module is configured to manage the collision avoidance system when it is active:

- by handling the second crane as a fixed crane when the second crane is in the "fixed work" mode, and,
- by handling the second crane as a mobile crane with an unknown position when the second crane is in the "displacement" mode.

* * * * *